US010523709B2

(12) United States Patent
Bower

(10) Patent No.: US 10,523,709 B2
(45) Date of Patent: *Dec. 31, 2019

(54) SYSTEM AND METHOD FOR DYNAMIC SECURITY CONFIGURATION IN A MULTITENANT APPLICATION SERVER ENVIRONMENT

(71) Applicant: ORACLE INTERNATIONAL CORPORATION, Redwood Shores, CA (US)

(72) Inventor: Peter Bower, Hollis, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,644

(22) Filed: Sep. 25, 2015

(65) Prior Publication Data

US 2016/0094583 A1 Mar. 31, 2016

Related U.S. Application Data

(60) Provisional application No. 62/056,429, filed on Sep. 26, 2014, provisional application No. 62/055,874, filed on Sep. 26, 2014.

(51) Int. Cl.
*G06F 17/00* (2019.01)
*H04L 29/06* (2006.01)

(52) U.S. Cl.
CPC .................. *H04L 63/20* (2013.01)

(58) Field of Classification Search
CPC ...... G06F 21/53; G06F 17/3023; G06F 3/067; G06F 21/60; G06F 9/45558;
(Continued)

(56) References Cited

U.S. PATENT DOCUMENTS 7,266,816 B1 * 9/2007 Sharma .................. G06F 9/465
717/170
8,266,616 B1 9/2012 Jacquot et al.
(Continued)

FOREIGN PATENT DOCUMENTS

CN 101639835 2/2010
CN 102170457 8/2011
(Continued)

OTHER PUBLICATIONS

United States Patent and Trademark Office, Third-Party Submission Under 37 CFR 1.290 Concise Description of Relevance dated April 22, 2016 for U.S. Appl. No. 14/866,644, 7 Pages.
(Continued)

*Primary Examiner* — Jason K Gee
*Assistant Examiner* — Lizbeth Torres-Diaz
(74) *Attorney, Agent, or Firm* — Tucker Ellis LLP

(57) ABSTRACT

In accordance with an embodiment, described herein is a system and method for supporting dynamic security configuration in a multitenant application server environment. Common configuration changes required for partition level security can be made without requiring a server restart, such as for example, adding a new security realm for a partition; deleting an existing realm; changing the configuration on an existing realm; adding or removing a security provider to a realm; or changing the configuration of a security provider. In accordance with an embodiment, also described herein is a system and method for supporting dynamic reconfiguration in a multitenant application server environment. Attributes of partition management components, for example managed beans (MBeans) and child MBeans contained within a partition, can be made dynamic and annotated accordingly, so that a restart of servers is not required for
(Continued)

configuration changes to those attributes for a particular partition.

20 Claims, 11 Drawing Sheets

(58) Field of Classification Search
CPC . H04L 41/0836; H04L 63/20; H04L 41/0813; H04L 63/107; H04L 63/105; H04L 67/34
See application file for complete search history.

(56) References Cited

U.S. PATENT DOCUMENTS

| | | | |
|---|---|---|---|
| 8,326,876 | B1 | 12/2012 | Venkataraman et al. |
| 8,352,608 | B1 | 1/2013 | Keagy et al. |
| 8,977,848 | B1* | 3/2015 | Tomlinson ............ G06F 9/5061 713/166 |
| 2002/0016892 | A1* | 2/2002 | Zalewski ............... G06F 9/5077 711/153 |
| 2002/0087687 | A1* | 7/2002 | Zaifman ............ G06F 11/0781 709/225 |
| 2005/0120160 | A1* | 6/2005 | Plouffe ............... G06F 9/45537 711/1 |
| 2007/0162720 | A1* | 7/2007 | Branda ................. G06F 9/5077 711/173 |
| 2008/0127076 | A1 | 5/2008 | Mcardle |
| 2010/0049959 | A1* | 2/2010 | Arcese ................ G06F 9/44505 713/1 |
| 2011/0225275 | A1 | 9/2011 | Shah et al. |
| 2012/0072597 | A1 | 3/2012 | Teather et al. |
| 2013/0191924 | A1* | 7/2013 | Tedesco .................. G06F 21/00 726/26 |
| 2014/0245275 | A1 | 8/2014 | Elias et al. |
| 2015/0277856 | A1* | 10/2015 | Payne ..................... G06F 7/588 708/255 |
| 2016/0094385 | A1* | 3/2016 | Bower ................ H04L 41/0836 709/221 |
| 2016/0366142 | A1* | 12/2016 | Kamble ................ H04L 63/101 |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |

OTHER PUBLICATIONS

United States Patent and Trademark Office, Office Action dated December 28, 2017 for U.S. Appl. No. 14/866,635, 12 Pages.
Chinese Patent Office, Office Action dated Jul. 20, 2018 for Application No. 201580003512.6, 8 pages.
United States Patent and Trademark Office, Office Action dated August 27, 2018 for U.S. Appl. No. 14/866,635, 23 Pages.
United States Patent and Trademark Office, Office Action dated May 9, 2019 for U.S. Appl. No. 14/866,635, 24 pages.

* cited by examiner

SYSTEM AND METHOD FOR DYNAMIC SECURITY CONFIGURATION IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Applications "SYSTEM AND METHOD FOR SECURITY DYNAMIC CONFIGURATION IN A MULTITENANT APPLICATION SERVER ENVIRONMENT", Application No. 62/056,429, filed Sep. 26, 2014; and "SYSTEM AND METHOD FOR DYNAMIC RECONFIGURATION IN A MULTITENANT APPLICATION SERVER ENVIRONMENT", Application No. 62/055,874, filed Sep. 26, 2014; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to systems and methods for supporting dynamic security configuration, and dynamic reconfiguration, in a multitenant application server environment.

BACKGROUND

Application servers generally provide a managed computing environment within which software applications can be deployed and run. Cloud-based computing environments allow applications to run within and take advantage of the distributed resources provided by a cloud. Such environments can support large numbers of users or tenants, some of which may have specific requirements that are particular to that user or tenant. Configuration changes that may be associated with a particular tenant should be made with minimal affect or downtime to other tenants. These are some examples of the type of environments in which embodiments of the present invention can be used.

SUMMARY

In accordance with an embodiment, described herein is a system and method for supporting dynamic security configuration in a multitenant application server environment. Common configuration changes required for partition level security can be made without requiring a server restart, such as for example, adding a new security realm for a partition; deleting an existing realm; changing the configuration on an existing realm; adding or removing a security provider to a realm; or changing the configuration of a security provider.

In accordance with an embodiment, also described herein is a system and method for supporting dynamic reconfiguration in a multitenant application server environment. Attributes of partition management components, for example managed beans (MBeans) and child MBeans contained within a partition, can be made dynamic and annotated accordingly, so that a restart of servers is not required for configuration changes to those attributes for a particular partition.

DETAILED DESCRIPTION

In accordance with an embodiment, described herein is a system and method for supporting dynamic security configuration in a multitenant application server environment. Common configuration changes required for partition level security can be made without requiring a server restart, such as for example, adding a new security realm for a partition; deleting an existing realm; changing the configuration on an existing realm; adding or removing a security provider to a realm; or changing the configuration of a security provider.

In accordance with an embodiment, also described herein is a system and method for supporting dynamic reconfiguration in a multitenant application server environment. Attributes of partition management components, for example managed beans (MBeans) and child MBeans contained within a partition, can be made dynamic and annotated accordingly, so that a restart of servers is not required for configuration changes to those attributes for a particular partition.

Application Server (e.g., Multi-Tenant, MT) Environment

Figure 1:
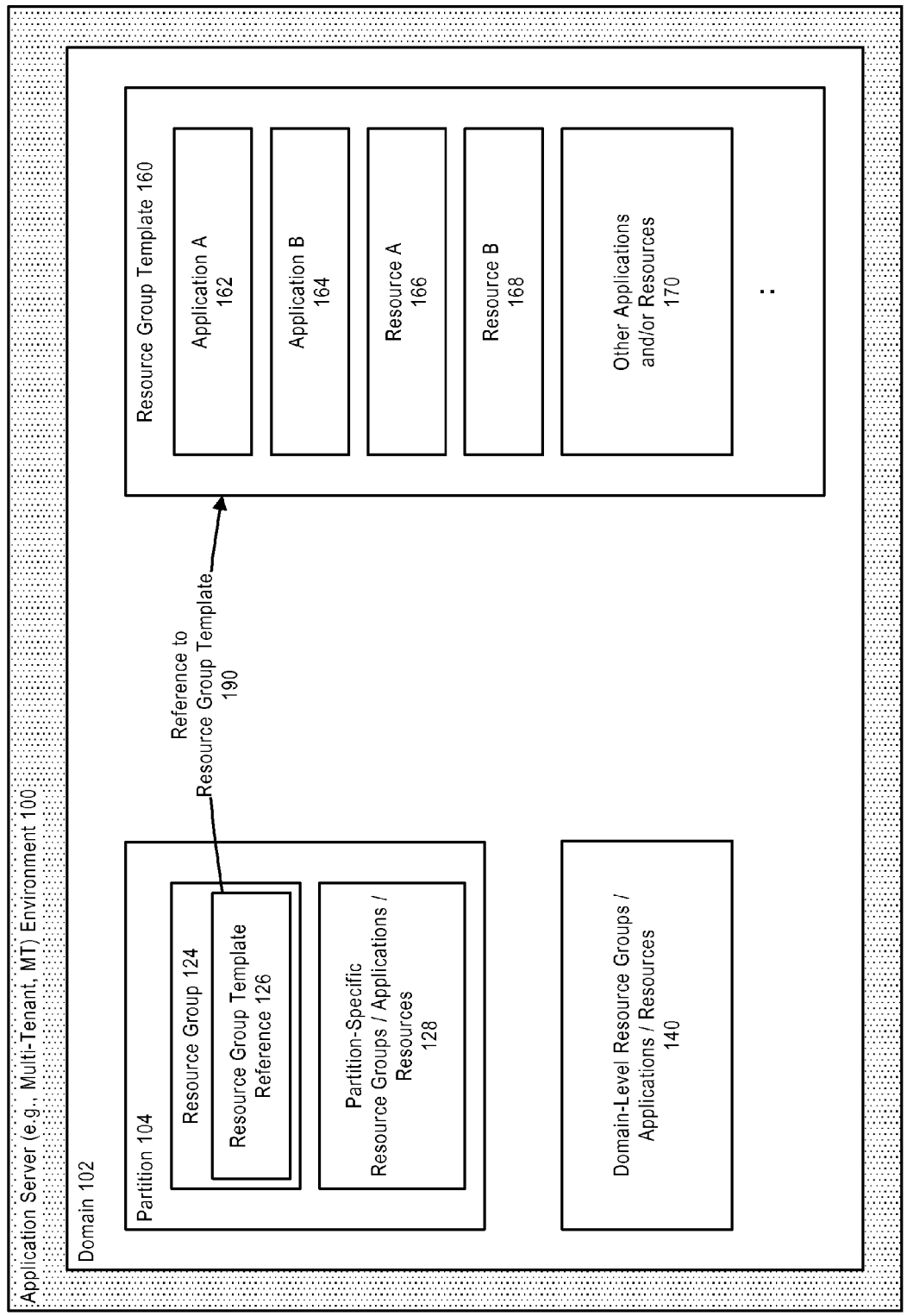
FIG. 1 illustrates a multitenant application server environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
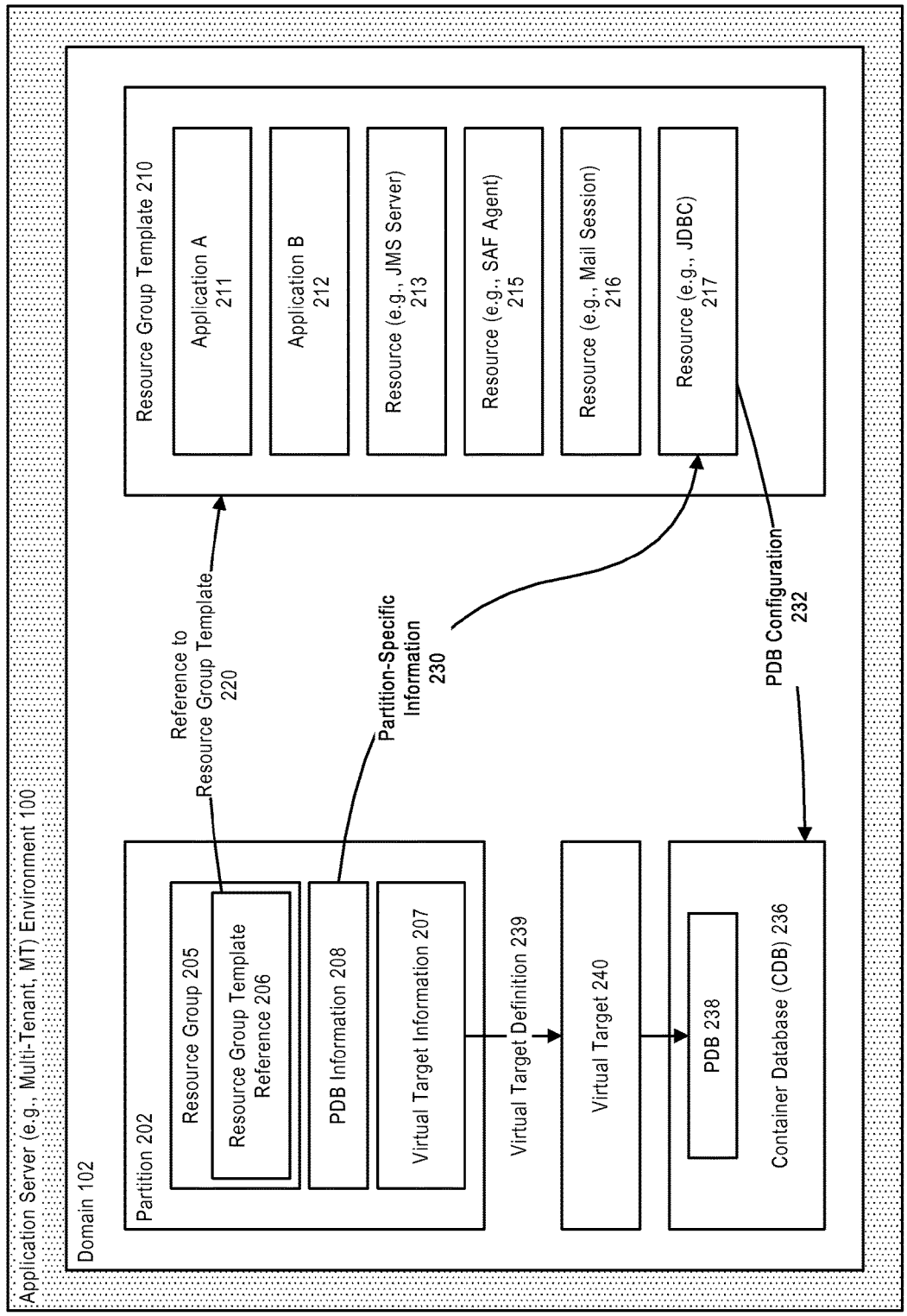
FIG. 2 further illustrates a multitenant application server environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
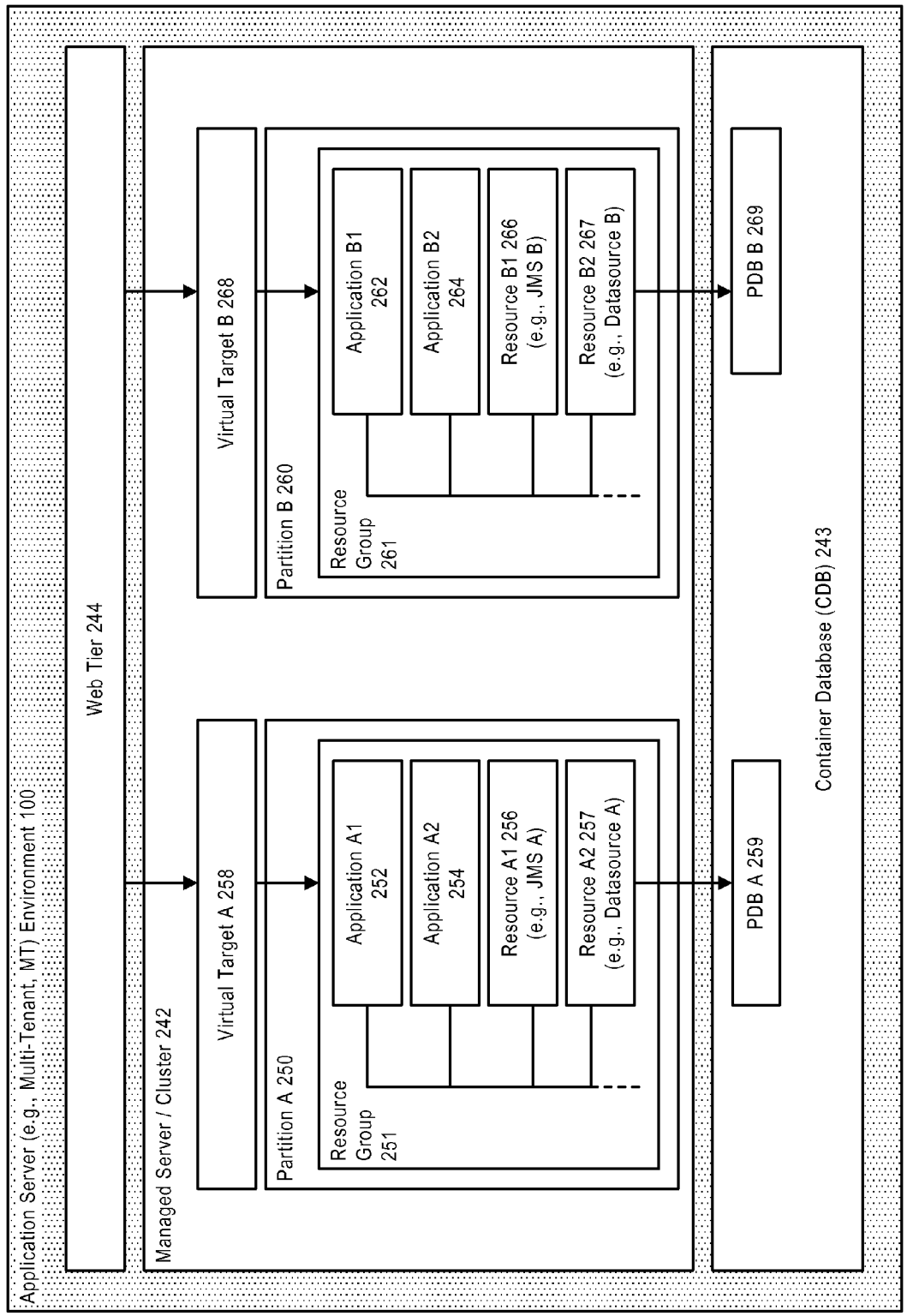
FIG. 3 further illustrates a multitenant application server environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
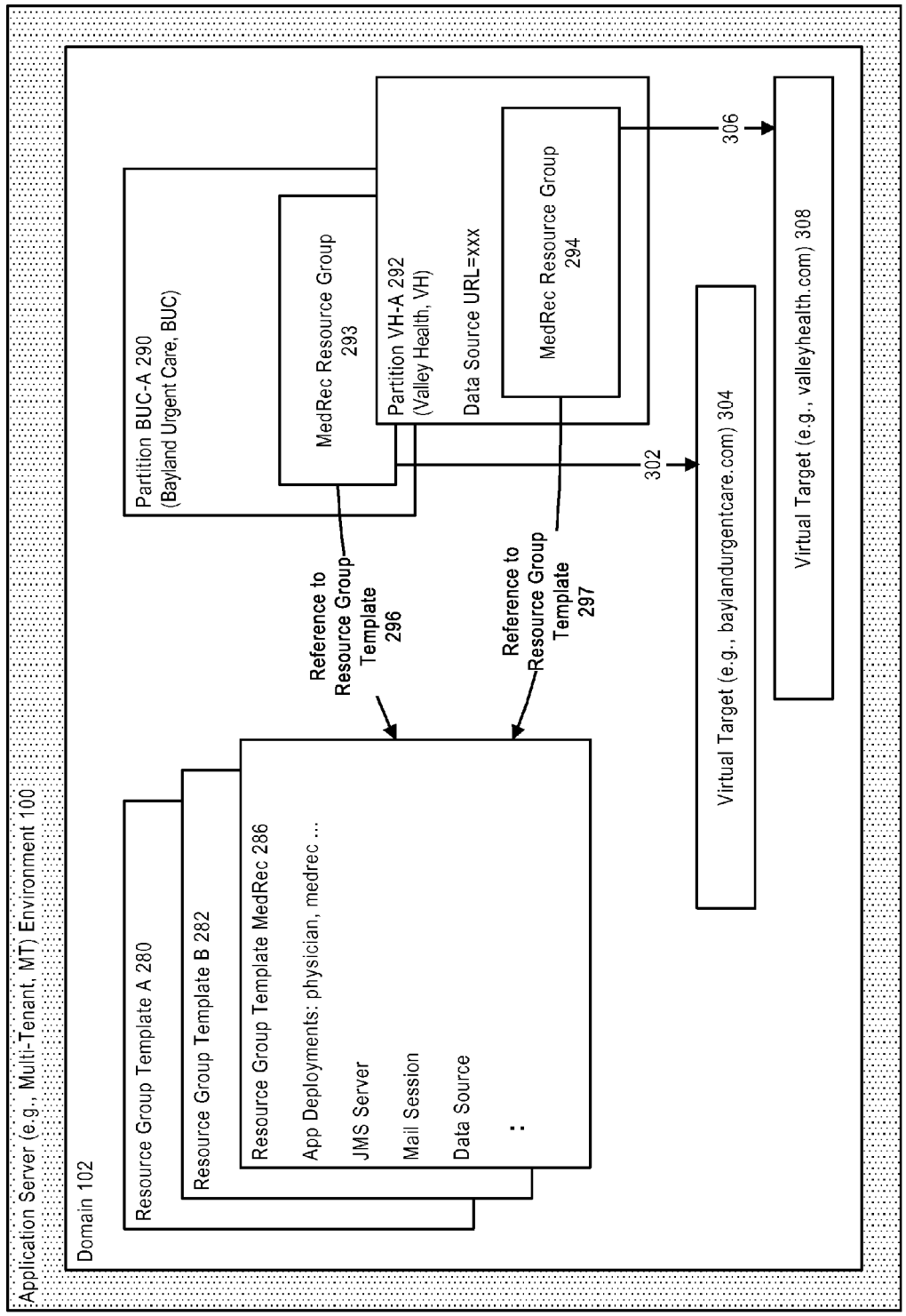
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
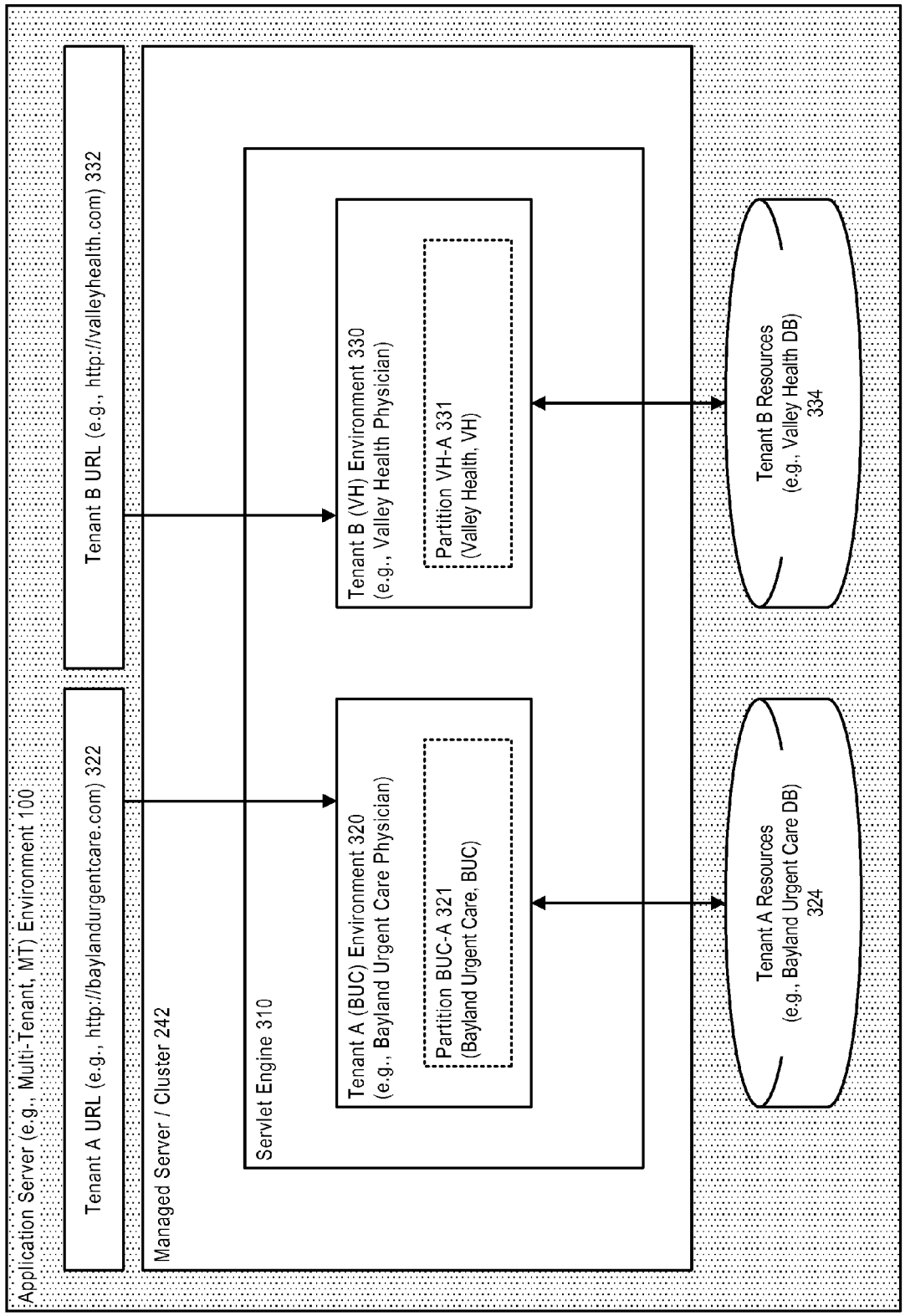
FIG. 5 further illustrates a multitenant application server environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Dynamic Security Configuration

In accordance with an embodiment, described herein is a system and method for supporting dynamic security configuration in a multitenant application server environment. Common configuration changes required for partition level security can be made without requiring a server restart, such as for example, adding a new security realm for a partition; deleting an existing realm; changing the configuration on an existing realm; adding or removing a security provider to a realm; or changing the configuration of a security provider.

In a multitenant application server environment, the security configuration associated with a domain or partition may occasionally need to be modified, to address particular security requirements.

Traditionally, any changes made to a security realm would require a server restart in order for those changes to take effect. However, restarting a server is not a desirable operation in a SaaS or other multitenant environment in which a plurality of otherwise unrelated tenants may share the same domain and managed servers.

In accordance with an embodiment, the system supports a variety of techniques for making the security configuration dynamic, including, for example, that configuration attributes can be retrieved from an associated configuration MBean, and that changes to those attributes take effect on the next use of the attributes. Change notification listeners can be used to apply new values of an attribute to impacted objects or to replace security configuration instances, for example by creating a new realm and provider instances when a realm configuration changes, and replacing the old realm with the new realm.

Figure 6:
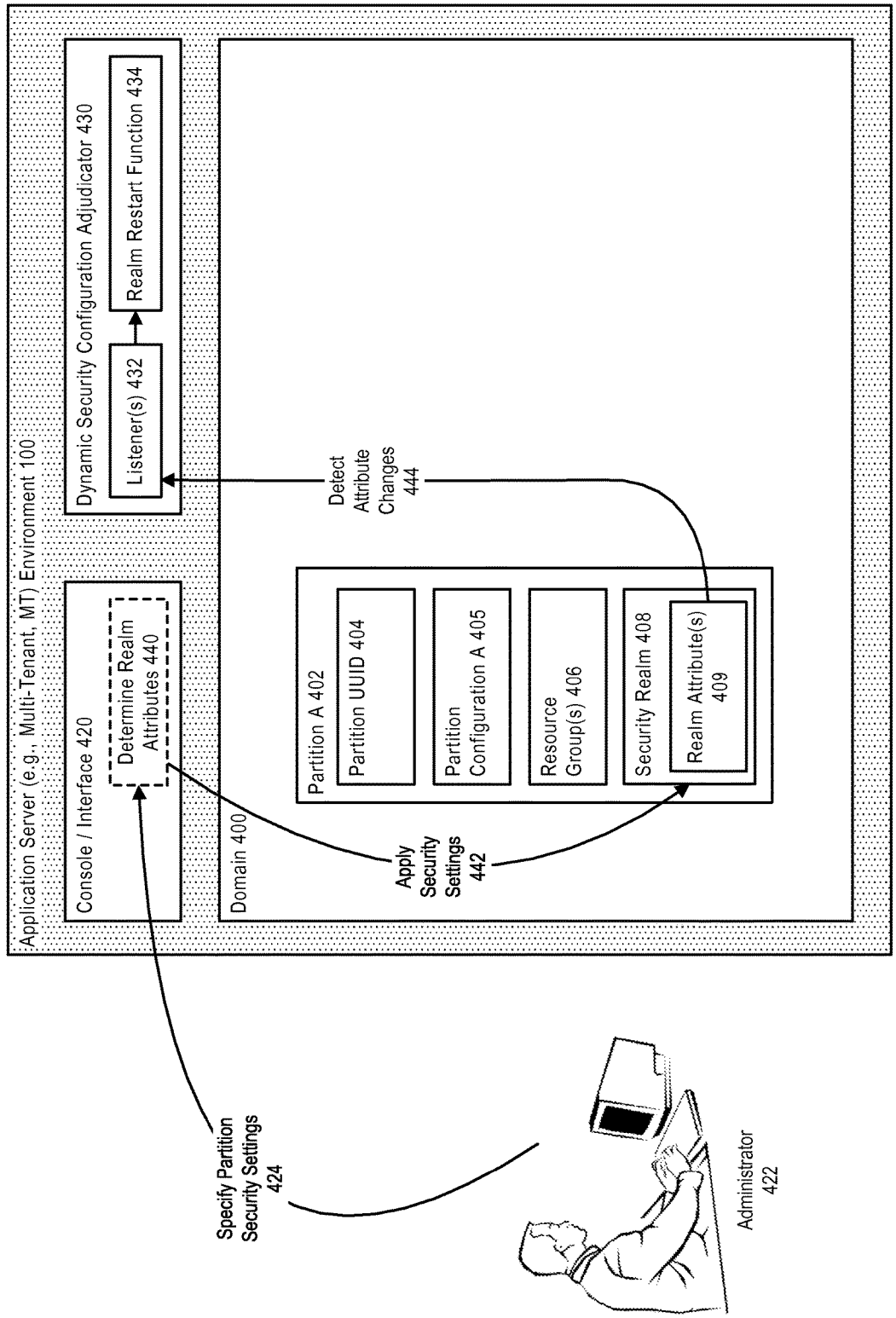
FIG. 6 illustrates dynamic security configuration in a multitenant application server environment, in accordance with an embodiment.

FIG. 6 illustrates dynamic security configuration in a multitenant application server environment, in accordance with an embodiment.

As illustrated in FIG. 6, in accordance with an embodiment, a domain 400, can include one or more partitions, here indicated as partition A 402, each of which can be associated with a globally unique partition identifier (UUID) 404, a partition configuration 405, resource group(s) 406, and a security realm 408 associated with one or more realm attribute(s) 409.

In accordance with an embodiment, a console or other interface 420 can be used by an administrator 422, to specify partition security settings 424 for a partition. A dynamic security configuration adjudicator 430 includes one or more change notification listener(s) 432, and a realm restart function 434.

In the context of this specification, the term administrator generally refers to the use of upper-stack components or other software components, in addition to human administrators.

Figure 7:
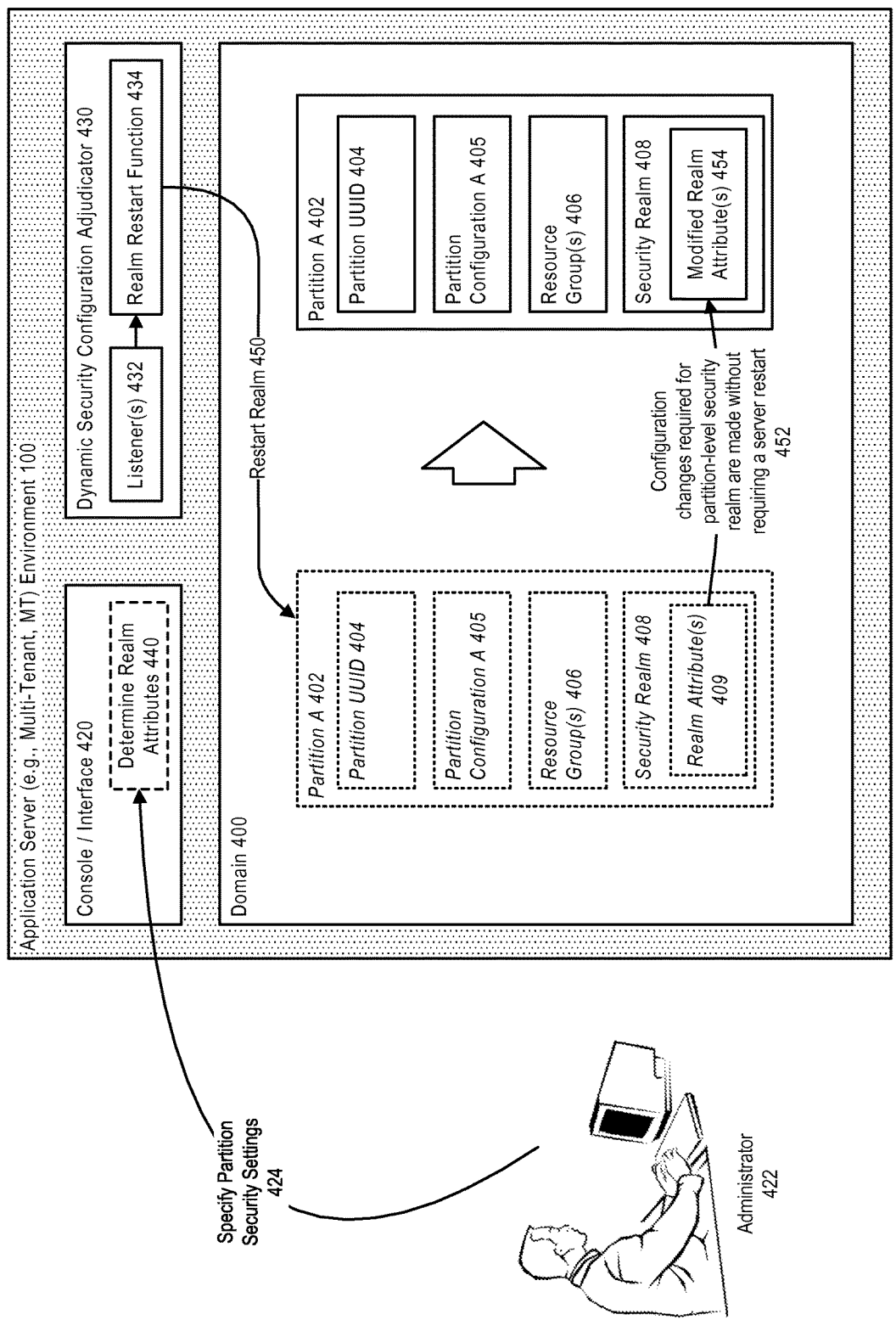
FIG. 7 further illustrates dynamic security configuration in a multitenant application server environment, in accordance with an embodiment.

As further illustrated in FIG. 7, the console or other interface can be used to determine which partition realm attributes to configure or change 440, and to apply those security settings 442 to the partition. Each realm can be associated with a Realm MBean. As described in further detail below, during an activation or commit phase, changes to realm attributes can be detected 444 by the configured listeners, and used by the adjudicator in determining when to restart a realm.

In accordance with an embodiment, security-related configurations can be modified using a console application and interface, a scripting language such as WebLogic Scripting Tool (WLST), or some other interaction, typically during an edit session. Examples of the types of the security-related configuration elements that can be modified in this manner include listen ports, and various attributes on those elements, e.g., the attributes associated with bringing up a (new) listen port.

In accordance with an embodiment, the system differentiates between realm attributes which are dynamic including that, when an edit session is activated or the changes to those attributes are otherwise committed, those changes take effect immediately; and realm attributes which are not dynamic but instead require a server restart for changes to take effect.

However, as described above, restarting a server is not a desirable operation in a SaaS or other multitenant environment in which a plurality of otherwise unrelated tenants may share the same domain and managed servers.

As such, if an environment includes a security realm per-partition, then it is advantageous if an administrator is able to make various changes to a particular partition-specific realm without causing a server restart and affecting other partition realms.

In accordance with an embodiment, the system enables the application server, or upper-stack providers, to determine dynamic changes; and further ensures that, if a particular realm attribute changes and an associated listener cannot handle the change dynamically, the realm is restarted by bringing up a new realm and shutting down the old realm.

In accordance with an embodiment, each listener can listen for changes to a specific attribute. For example, a listener can listen for a particular change bringing down a listen port, and bringing up a new listen port, by listening for changes to a listen port attribute.

FIG. 7 further illustrates dynamic security configuration in a multitenant application server environment, in accordance with an embodiment.

As illustrated in FIG. 7, in accordance with an embodiment, upon a listener detecting an associated attribute change, if any changes within the realm are determined to be non-dynamic, then the dynamic security configuration adjudicator can direct the system to automatically restart the realm for that partition, to apply those changes, and, if so, uses the realm restart function to restart the realm 450 for that partition. The configuration changes required for partition level security realm can be made without requiring a server restart 452, and instead the partition is restarted with the modified realm attributes 454.

In accordance with an embodiment, the system supports the use of multiple partition realms, including the ability to enable realm restart for selected partition realms. Restarting a partition realm generally does not require redeploying applications to the partition.

The system can also recognize a time period to allow in-progress work to be completed for that period of time, before retiring a particular partition realm. This allows in-progress work to complete under the constraints of the previous security realm if necessary.

Figure 8:
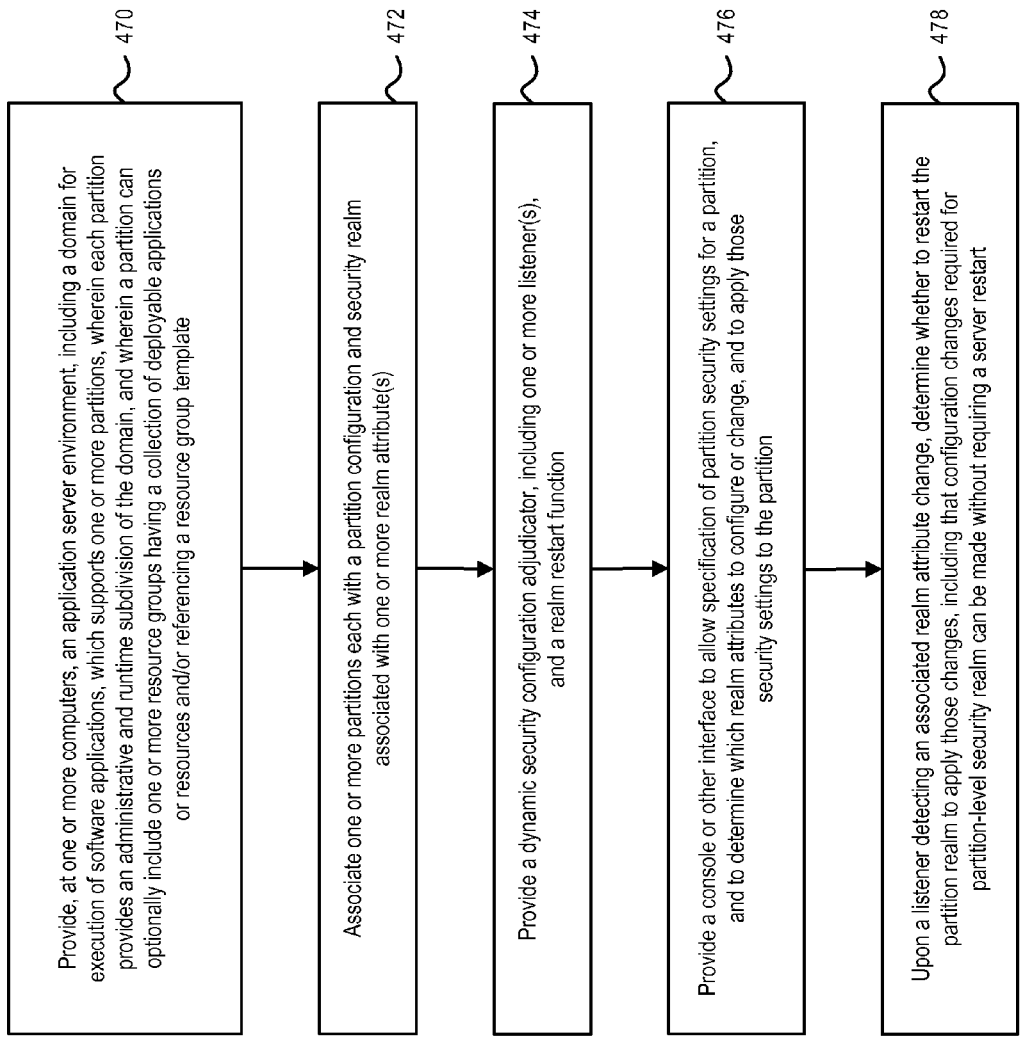
FIG. 8 illustrates a flowchart of method for supporting dynamic security configuration in a multitenant application server environment, in accordance with an embodiment.

FIG. 8 illustrates a flowchart of method for supporting dynamic security configuration in a multitenant application server environment, in accordance with an embodiment.

As illustrated in FIG. 8, in accordance with an embodiment, at step 470, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 472, one or more partitions are each associated with a partition configuration and security realm associated with one or more realm attribute(s).

At step 474, a dynamic security configuration adjudicator is provided, including one or more listener(s), and a realm restart function.

At step 476, a console or other interface is provided to allow specification of partition security settings for a partition, and to determine which realm attributes to configure or change, and to apply those security settings to the partition.

At step 478, upon a listener detecting an associated realm attribute change, the dynamic security configuration adjudicator can determine whether to restart the partition realm to apply those changes, including that configuration changes required for partition level security realm can be made without requiring a server restart.

In accordance with an embodiment, an application server, e.g., WLS, domain can includes a plurality of security-related configuration elements, such as, for example, the SecurityConfiguration element; the Realm configuration element; the Security Provider configuration elements; the Domain level configuration including Embedded LDAP; SSL related configuration elements including SSL, Server, and Network Access Point configuration; and SAML related configuration elements including FederatedServices and SingleSignOnServices configuration. In accordance with various embodiments configuration elements other than MBeans, for example REST APIs or offline WLST, can be used to perform similar operations, without the use of JMX MBeans.

In accordance with an embodiment, the application server can also include a set of security providers. Upper-stack components can provide their own security providers; while customers can develop custom security providers that are specific to their environment. Each security provider can support dynamic configuration for a subset of their configuration attributes, including, for example, fetching attribute values from the configuration bean or using JMX to be notified of changes to the configuration.

As described above, in accordance with an embodiment, the system determines whether a non-dynamic attribute change requires a server restart. For example, a change to the configuration for a particular server may require a restart of that particular server, but not of another server. Similarly, a change to an application deployment may require a redeploy of the application, but not a server restart of any servers. The administrator can elect to auto-restart a realm instead of requiring a server restart of all servers in the domain.

In accordance with an embodiment, the system supports a user-controlled auto realm restart option if non-dynamic changes are made to application server, upper-stack (e.g., Oracle Fusion Middleware (FMW) or Fusion Application (FA)), or custom security providers. With such an option enabled, the application server will determine if any non-dynamic changes are made to the realm or providers contained by the realm, and if so, then the realm will be restarted automatically when committing those changes.

In accordance with an embodiment, an attribute in the Realm configuration (e.g., Realm MBean) can allow an administrator to control whether auto-restart occurs; the default is to enable auto-restart. Another attribute can allow the administrator to configure the timeout period when the previous realm is shutdown.

Exemplary Scenarios

In accordance with various embodiment, various exemplary scenarios are described below, for purposes of illustration, to demonstrate how the realm restart functionality can impact configuration changes.

Dynamic Changes:
1. In this scenario, an administrator/user makes changes to dynamic attributes of the realm or provider.
2. The administrator/user does not make any non-dynamic changes to other application server configuration.
3. The administrator/user activates the changes.
4. In this scenario, all changes are dynamic; so a realm restart is not required; and a server restart is likewise not required.

Non-Dynamic Changes to Realm or Provider:
1. In this scenario, the realm has auto-restart set for non-dynamic changes.
2. The administrator/user makes changes to non-dynamic attributes of the realm or provider.
3. The administrator/user does not make any non-dynamic changes to other application server configuration.
4. The administrator/user activates the changes.
5. In this scenario, the realm or provider changes are non-dynamic, but auto-restart is configured; so the realm is restarted during commit of activate changes process; while a server restart is not required.

Non-Dynamic Changes to Other Application Server Configurations:
1. In this scenario, the realm has auto-restart set for non-dynamic changes.
2. The administrator/user makes changes to non-dynamic attributes of the realm or provider.
3. The administrator/user makes non-dynamic changes to other application server configuration such as the Domain.
4. The administrator/user activates the changes.
5. In this scenario, the realm or provider changes are non-dynamic, and auto-restart is configured; however, other non-dynamic changes are present so the commit phase of activate changes is not performed; the realm is not restarted since commit is not performed; a server restart is required.

Dynamic Reconfiguration

In accordance with an embodiment, also described herein is a system and method for supporting dynamic reconfiguration in a multitenant application server environment. Attributes of partition management components, for example managed beans (MBeans) and child MBeans contained within a partition, can be made dynamic and annotated accordingly, so that a restart of servers is not required for configuration changes to those attributes for a particular partition.

In a multitenant application server environment, a domain can contain multiple partitions. However, as with the security configuration functionality described above, restarting a server to make changes to a domain configuration is likewise not a desirable operation in a SaaS or other multitenant environment in which a plurality of otherwise unrelated tenants may share the same domain and managed servers. Instead, reconfiguration of global or of partition-specific resources should preferably be accomplished without requiring restart of servers or clusters.

For example, in SaaS and PaaS use cases, changes required for individual partitions should preferably not impact other partitions by requiring a server restart.

In accordance with an embodiment, each partition requires configuration at the domain or security configuration level, and can be associated with a partition MBean. The attributes of the Partition Mbean, and its child MBeans also contained within the partition, can be made dynamic, so that no restart of servers is required for configuration changes to that partition. Partition configuration elements can be annotated accordingly at the MBean level.

Figure 9:
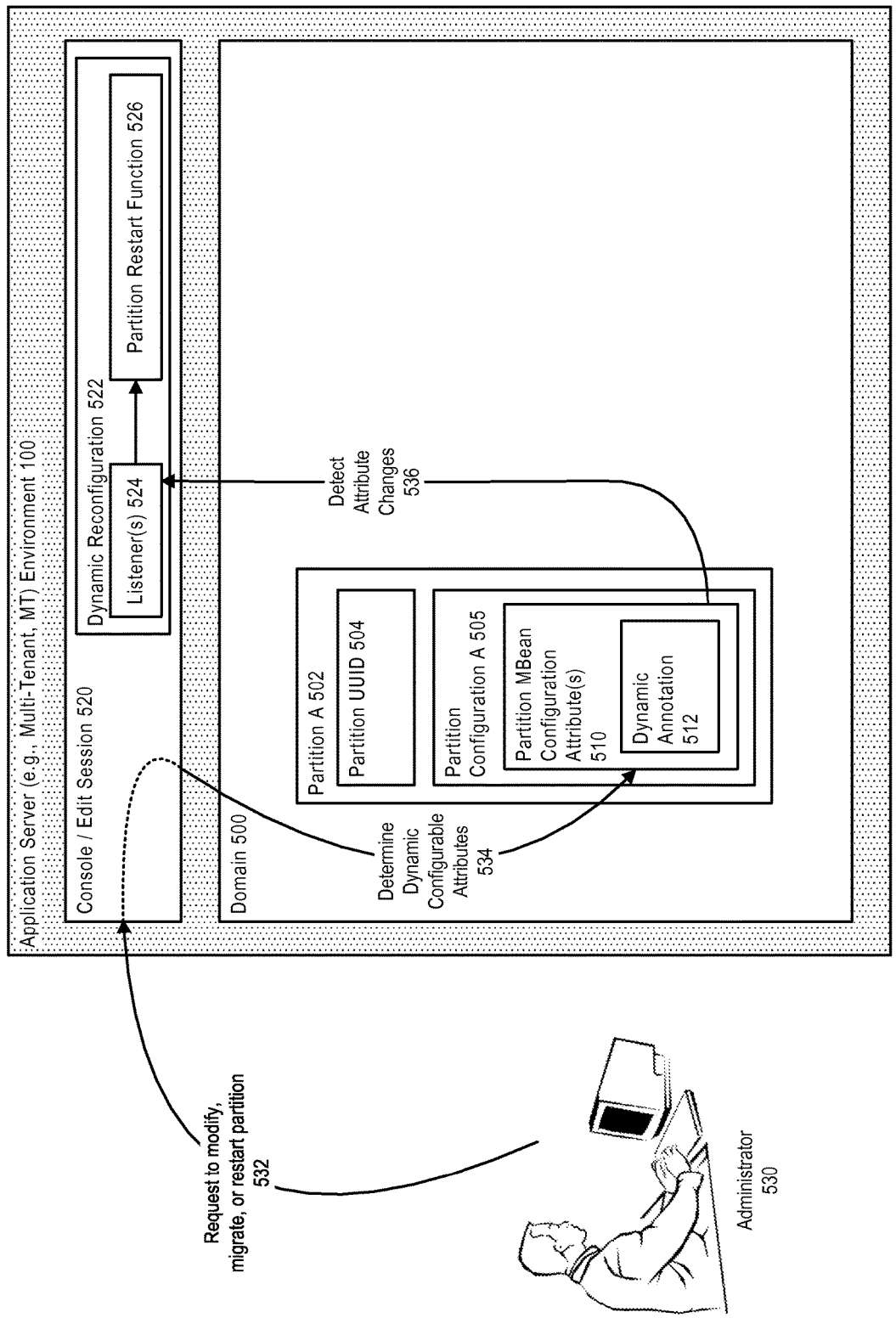
FIG. 9 illustrates dynamic reconfiguration in a multitenant application server environment, in accordance with an embodiment.

FIG. 9 illustrates dynamic reconfiguration in a multitenant application server environment, in accordance with an embodiment.

As illustrated in FIG. 9, in accordance with an embodiment, a domain 500, can include one or more partitions, here indicated as partition A 502, each of which can be associated with a partition unique identifier (UUID) 504 and partition configuration 505 that can be associated with and/or defined by one or more management components, for example a managed bean (MBean) and configuration attribute(s) 510, each of which can be associated with a dynamic annotation 512. A console/edit session 520 can be used by administrators to configure partitions. A dynamic reconfiguration module 522 includes one or more listener(s) 524, and a partition restart function 526.

Upon receiving from an administrator 530 a request to modify, migrate, or restart partition 532, console/edit session console can determine dynamic configurable attributes 534, which are detected 536 by the configured listeners.

In accordance with an embodiment, configuration attributes can be annotated or otherwise marked as being dynamic. For example, a partition level MBean configuration can be made dynamic, as can provider Mbeans.

In accordance with an embodiment, a partition restart is similar to a realm restart as described above. However, a partition restart is generally performed by way of a manual or user-controlled operation, while a realm restart is generally controlled by an automated process such as an adjudicator as described above. In some environments, a partition restart can also be used to support other functions, for example partition migration between two managed servers or clusters.

In accordance with an embodiment, once an attribute has been annotated as being dynamic at the MBean level, the system can, during build time, scan those annotations and determine which are dynamic, and which are non-dynamic, attributes. Various levels of the system can be made restartable, including, for example, server, partition, and application levels. Although it may be preferable that all attributes of a partition MBean and child MBean be dynamic, it may be not possible to make all of them dynamic, and for changes to those attributes a partition restart may have to be performed.

Figure 10:
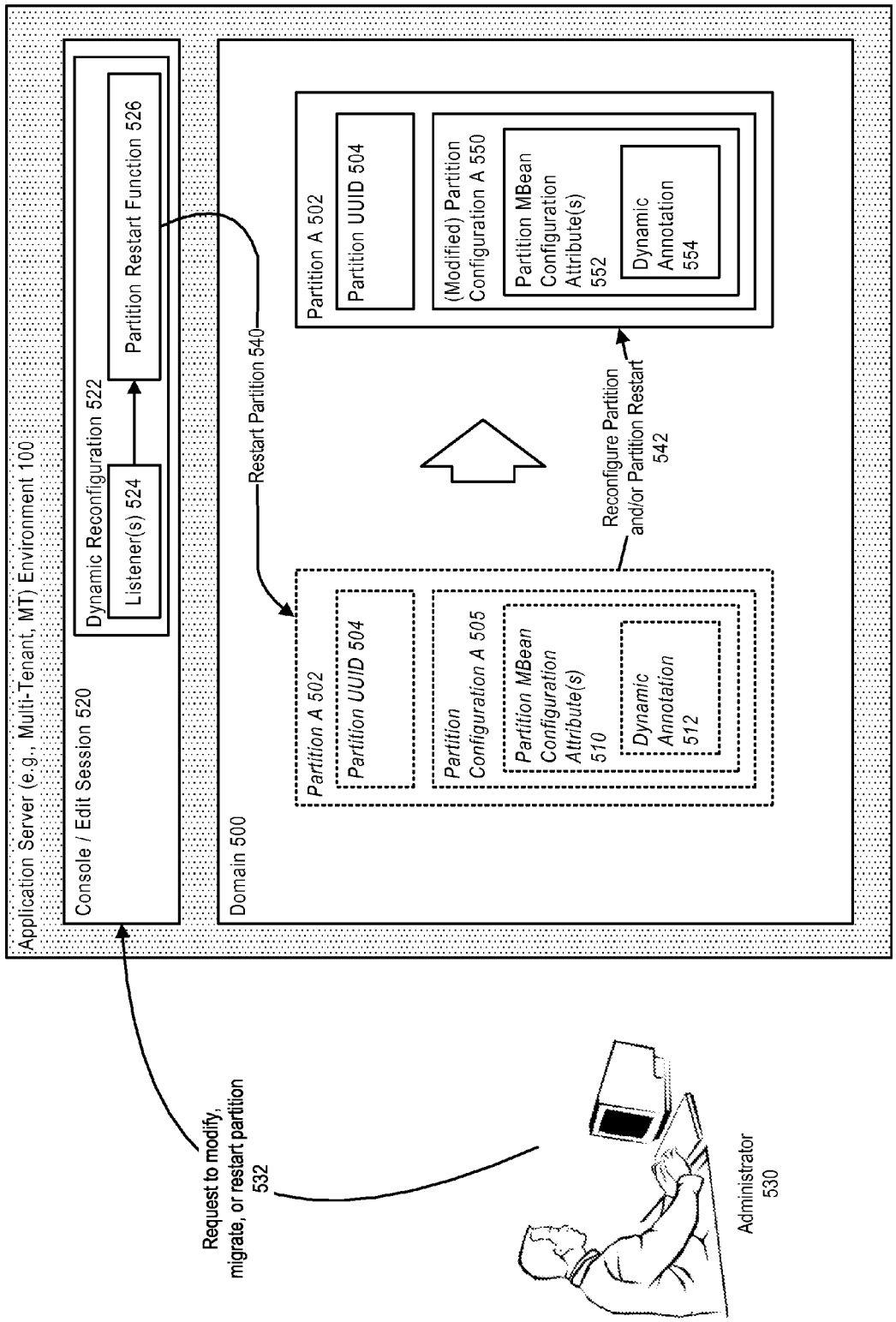
FIG. 10 further illustrates dynamic reconfiguration in a multitenant application server environment, in accordance with an embodiment.

FIG. 10 further illustrates dynamic reconfiguration in a multitenant application server environment, in accordance with an embodiment.

As illustrated in FIG. 10, in accordance with an embodiment, upon detecting the dynamic change, the system can make a determination to reconfigure and/or restart the partition 540 to apply the configuration changes 542, so that the new partition has the modified partition configuration 550 (with attributes 552 and annotations 554 as appropriate).

Figure 11:
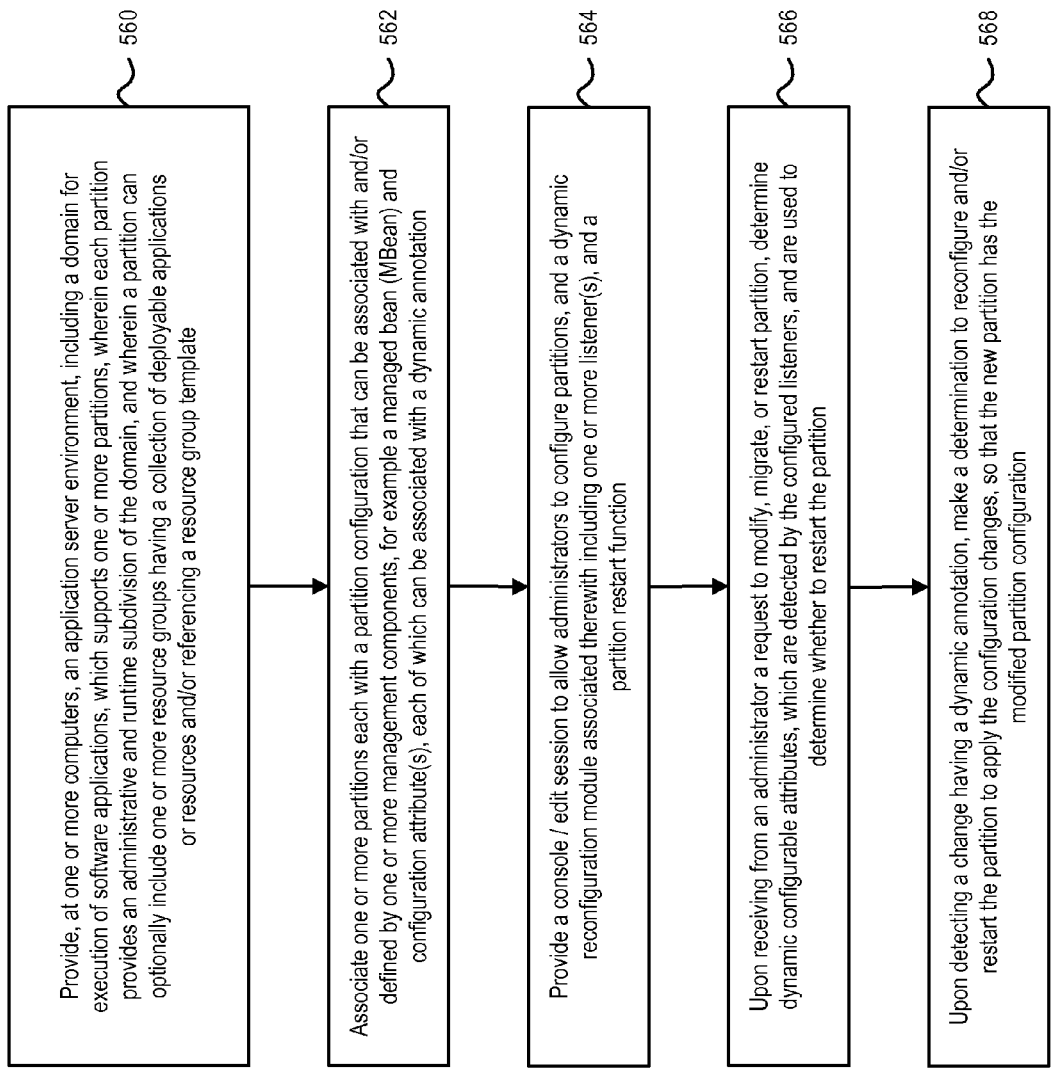
FIG. 11 illustrates a flowchart of method for supporting dynamic reconfiguration in a multitenant application server environment, in accordance with an embodiment.

FIG. 11 illustrates a flowchart of method for supporting dynamic reconfiguration in a multitenant application server environment, in accordance with an embodiment.

As illustrated in FIG. 11, in accordance with an embodiment, at step 560, an application server environment is again provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 562, one or more partitions are each associated with a partition configuration that can be associated with and/or defined by one or more management components, for example a managed bean (MBean) and configuration attribute(s), each of which can be associated with a dynamic annotation.

At step 564, a console/edit session is provided to allow administrators to configure partitions, and a dynamic reconfiguration module associated therewith including one or more listener(s), and a partition restart function.

At step 566, upon receiving from an administrator a request to modify, migrate, or restart partition, the console/edit session console can determine dynamic configurable attributes, which are detected by the configured listeners, and are used to determine whether to restart the partition.

At step 568, upon detecting a change having a dynamic annotation, the system can make a determination to reconfigure and/or restart the partition to apply the configuration changes, so that the new partition has the modified partition configuration (with attributes and annotations as appropriate).

As described above, in accordance with an embodiment, configuration elements can be indicated as being dynamically reconfigurable by annotating the configuration elements at the Mbean level, for example as @dynamic. Subsystems that use these attributes can use whichever infrastructure is provided by the application server (e.g., WebLogic, WLS) for handling configuration changes dynamically, for example by using a BeanUpdateListener to listen for configuration changes and ensuring that dynamic changes are applied to the running system; and always obtaining the attribute value from the configuration MBean and never storing the value in a subsystem-specific data structure.

In accordance with an embodiment, dynamic elements can be picked up dynamically during runtime, and cause no service interruption when changed. Non-dynamic elements generally require a server restart to pick up the new value. If a non-dynamic element appears on a deployable resource, then that resource can be redeployed to apply a change (without a server restart). Server restarts can also be avoided by making all (or most) of the configuration elements dynamic, and where this is not practical, requiring a system resource or a partition restart as appropriate.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting dynamic security configuration in a multitenant application server environment, comprising:
one or more computers, including an application server environment executing thereon, and a domain for execution of software applications;
wherein the application server environment provides a plurality of partitions,
wherein each partition provides an administrative and runtime subdivision of the domain, that can be associated with a tenant, and
wherein the application server environment provides a plurality of realms associated with the plurality of partitions, including that each particular partition is associated with a particular security realm that is used with the particular partition and associated with one or more attributes; and wherein the system enables configuration changes to be made for partition level security, by associating one or more listeners with the attributes of the security realm, that detect changes to the attributes, wherein each listener listens for changes to a specific attribute, and whereupon changes to the attributes being detected for the particular partition, a determination is made whether to restart one or both of the security realm associated with the particular partition, or a server hosting the particular partition, including:

upon determining that the changes to the attributes are all dynamic changes, then applying the changes to the security realm for the particular partition, without restarting either the security realm associated with the particular partition or the server hosting the particular partition; and upon a particular listener determining an associated attribute change is non-dynamic, then directing the system whether to restart one or both of:
(a) the security realm associated with the particular partition, or
(b) the server hosting the particular partition,
to apply the attribute change, and cause the particular partition to be restarted with the changed attributes.

2. The system of claim 1, wherein the configuration changes include at least one of:
adding a new security realm for a partition;
deleting an existing security realm;
changing configuration on an existing security realm;
adding or removing a security provider to a security realm; or
changing configuration of a security provider.

3. The system of claim 1, wherein the system includes a dynamic security configuration adjudicator that operates with the one or more listeners to apply new values of an attribute to impacted objects or to replace security configuration instances.

4. The system of claim 3, wherein upon a particular listener detecting an associated attribute change, the dynamic security configuration adjudicator determines whether to restart the partition security realm to apply the attribute change.

5. The system of claim 1, wherein each partition can include one or more resource groups.

6. The system of claim 1, further comprising at least one of a console or other interface that enables specification of partition security settings for the one or more partitions.

7. The system of claim 1, whereupon a particular attribute being changed and an associated listener determining it cannot handle the attribute change dynamically, the security realm is restarted by bringing up a new realm and shutting down the old realm.

8. The system of claim 1, wherein if any changes within the security realm are determined to be non-dynamic, then the dynamic security configuration adjudicator directs the system to automatically restart the security realm for the partition, to apply those changes.

9. The system of claim 1, wherein each partition security realm is associated with a configuration component that enables attributes of the security realm to be annotated as being dynamic attributes or non-dynamic attributes, and wherein the configuration component and its annotations are used to determine whether changes to particular security realm attributes are dynamic changes or non-dynamic changes.

10. A method for supporting dynamic security configuration in a multitenant application server environment, comprising:
providing, at one or more computers, including an application server environment executing thereon,
a domain for execution of software applications; and
a plurality of partitions,
wherein each partition provides an administrative and runtime subdivision of the domain, that can be associated with a tenant, and
wherein the application server environment provides a plurality of realms associated with the plurality of partitions, including that each particular partition is associated with a particular security realm that is used with the particular partition and associated with one or more attributes; and
wherein configuration changes for partition level security are made, by associating one or more listeners with the attributes of the security realm, that detect changes to the attributes, wherein each listener listens for changes to a specific attribute, and whereupon changes to the attributes being detected for the particular partition, a determination is made whether to restart one or both of the security realm associated with the particular partition, or a server hosting the particular partition, including:

upon determining that the changes to the attributes are all dynamic changes, then applying the changes to the security realm for the particular partition, without restarting either the security realm associated with the particular partition or the server hosting the particular partition; and upon a particular listener determining an associated attribute change is non-dynamic, then directing whether one or both of:
(a) the security realm associated with the particular partition, or
(b) the server hosting the particular partition,
is to be restarted, to apply the attribute change, and cause the particular partition to be restarted with the changed attributes.

11. The method of claim 10, wherein the configuration changes include at least one of:
adding a new security realm for a partition;
deleting an existing security realm;
changing configuration on an existing security realm;
adding or removing a security provider to a security realm; or
changing configuration of a security provider.

12. The method of claim 10, further comprising providing a dynamic security configuration adjudicator that operates with the one or more listeners to apply new values of an attribute to impacted objects or to replace security configuration instances.

13. The method of claim 12, wherein upon a particular listener detecting an associated attribute change, the dynamic security configuration adjudicator determines whether to restart the partition security realm to apply the attribute change.

14. The method of claim 10, wherein each partition can include one or more resource groups.

15. The method of claim 10, further comprising providing at least one of a console or other interface that enables specification of partition security settings for the one or more partitions.

16. The method of claim 10, wherein each partition security realm is associated with a configuration component that enables attributes of the security realm to be annotated as being dynamic attributes or non-dynamic attributes, and wherein the configuration component and its annotations are used to determine whether changes to particular security realm attributes are dynamic changes or non-dynamic changes.

17. A non-transitory computer readable storage medium, including instructions stored thereon which when read and executed by one or more computers cause the one or more computers to perform the steps comprising:

providing an application server environment, together with
 a domain for execution of software applications; and
 a plurality of partitions,
  wherein each partition provides an administrative and runtime subdivision of the domain, that can be associated with a tenant, and
  wherein the application server environment provides a plurality of realms associated with the plurality of partitions, including that each particular partition is associated with a particular security realm that is used with the particular partition and associated with one or more attributes; and
 wherein configuration changes for partition level security are made, by associating one or more listeners with the attributes of the security realm, that detect changes to the attributes, wherein each listener listens for changes to a specific attribute, and whereupon changes to the attributes being detected for the particular partition, a determination is made whether to restart one or both of the security realm associated with the particular partition, or the server hosting the particular partition, including:
  upon determining that the changes to the attributes are all dynamic changes, then applying the changes to the security realm for the particular partition, without restarting either the security realm associated with the particular partition or a server hosting the particular partition; and
  upon a particular listener determining an associated attribute change is non-dynamic, then directing whether one or both of:
   (a) the security realm associated with the particular partition, or
   (b) the server hosting the particular partition,
   is to be restarted, to apply the attribute change, and cause the particular partition to be restarted with the changed attributes.

18. The non-transitory computer readable storage medium of claim 17, wherein the configuration changes include at least one of:
 adding a new security realm for a partition;
 deleting an existing security realm;
 changing configuration on an existing security realm;
 adding or removing a security provider to a security realm; or
 changing configuration of a security provider.

19. The non-transitory computer readable storage medium of claim 17, further comprising providing a dynamic security configuration adjudicator that operates with the one or more listeners to apply new values of an attribute to impacted objects or to replace security configuration instances.

20. The non-transitory computer readable storage medium of claim 19, wherein upon a particular listener detecting an associated attribute change, the dynamic security configuration adjudicator determines whether to restart the partition security realm to apply the attribute change.

* * * * *